(12) United States Patent
Niewczas et al.

(10) Patent No.: US 9,310,273 B2
(45) Date of Patent: Apr. 12, 2016

(54) OPTICAL FIBRE SENSOR INTERROGATION SYSTEM

(75) Inventors: Pawel Niewczas, Glasgow (GB); Philip Orr, Glasgow (GB)

(73) Assignee: University of Strathelyde, Glasgow (GB)

( * ) Notice: Subject to any disclaimer, the term of this patent is extended or adjusted under 35 U.S.C. 154(b) by 8 days.

(21) Appl. No.: 14/128,621

(22) PCT Filed: Jun. 28, 2012

(86) PCT No.: PCT/GB2012/000556
§ 371 (c)(1),
(2), (4) Date: Feb. 26, 2014

(87) PCT Pub. No.: WO2013/001268
PCT Pub. Date: Jan. 3, 2013

(65) Prior Publication Data
US 2014/0211202 A1     Jul. 31, 2014

(30) Foreign Application Priority Data
Jun. 29, 2011 (GB) .................................. 1111030.1

(51) Int. Cl.
G01B 9/02         (2006.01)
G01M 11/00      (2006.01)
G01D 5/353      (2006.01)

(52) U.S. Cl.
CPC ............. *G01M 11/30* (2013.01); *G01D 5/3539* (2013.01); *G01D 5/35316* (2013.01); *G01D 5/35335* (2013.01); *G01D 5/35387* (2013.01)

(58) Field of Classification Search
CPC .......... G01D 5/35306; G01D 3/35316; G01D 3/35335; G01D 3/35387; G01D 3/3539; G01J 9/00; G01J 9/02; G01J 9/0246; G01J 2009/0226; G01J 2009/023; G01J 2009/0288; G01M 11/30; G01M 11/31
See application file for complete search history.

(56) References Cited

U.S. PATENT DOCUMENTS 5,680,489 A    10/1997  Kersey
5,987,197 A *  11/1999  Kersey ............................ 385/12

(Continued)

FOREIGN PATENT DOCUMENTS

EP    1902923 A2    3/2008

OTHER PUBLICATIONS

International Searching Authority, International Search Report for International Application No. PCT/GB2012/000556, mailed Jan. 9, 2013, 6 pages, European Patent Office, The Netherlands.

(Continued)

*Primary Examiner* — Michael A Lyons
(74) *Attorney, Agent, or Firm* — Alston & Bird LLP

(57) ABSTRACT

A monitoring system for monitoring a plurality of fiber Bragg gratings in an optical fiber, each fiber Bragg grating being sensitive to a different wavelength of light. The system comprises a broadband source for illuminating the optical fiber; at least one optical interferometer; light feeding means for feeding to an input of the interferometer light reflected from the fiber Bragg gratings, and a processor for processing the output from the interferometer to determine the wavelength of the reflected light. The light feeding means comprise a wavelength division multiplexer operable to separate light received from the optical fiber into a plurality of wavelengths, each associated with one of the fiber Bragg gratings and/or a time division mulitplexer operable to separate light received from the optical fiber into in a time separated series.

12 Claims, 9 Drawing Sheets

(56) References Cited

U.S. PATENT DOCUMENTS

| | | |
|---|---|---|
| 6,298,185 B1 | 10/2001 | Lai et al. |
| 6,674,928 B2 * | 1/2004 | Johnson et al. ............... 385/12 |
| 2002/0041722 A1 | 4/2002 | Johnson et al. |

OTHER PUBLICATIONS

Kersey, A. D., et al., "Multiplexed Fiber Bragg Grating Strain-Sensor System with a Fiber Fabry-Perot Wavelength Filter", Optics Letters, Aug. 15, 1993, vol. 18, No. 16, pp. 1370-1372, Optical Society of America, USA.

Todd, M. D., et al., "Passive, Light Intensity-Independent Interferometric Method for Fibre Bragg Grating Interrogation", Electronics Letters, Oct. 28, 1999, vol. 35, No. 22, pp. 1970-1971, IEE Stevenage, GB.

Todd, M. D., et al., "A Novel Bragg Grating Sensor Interrogation System Utilizing a Scanning Filter, a Mach-Zehnder Interferometer and a 3×3 Coupler", Measurement Science and Technology, 2001, vol. 12, pp. 771-777, Institute of Physics Publishing, UK.

Todd, M. D., et al., "Improved, Operationally-Passive Interferometric Demodulation Method Using 3×3 Coupler", Electronics Letters, 2002, vol. 38, No. 15, pp. 784-786, Institution of Electrical Engineers, England.

Kersey, A. D., et al., "High-Resolution Fibre-Grating Based Strain Sensor with Interferometric Wavelength-Shift Detection", Electronics Letters, 1992, vol. 28, No. 3, pp. 236-238, Institution of Electrical Engineers, England.

Schleip, F., et al., "Phase Sensitive Investigations of 3×3 Singlemode Fibre Directional Couplers", Electronics Letters, 1993, vol. 29, pp. 68-70, Institution of Electrical Engineers, England.

\* cited by examiner

OPTICAL FIBRE SENSOR INTERROGATION SYSTEM

CROSS REFERENCE TO RELATED APPLICATIONS

This application is a national stage application, filed under 35 U.S.C. §371, of International Application No. PCT/GB2012/000556, filed Jun. 28, 2012, which claims priority to and the benefit of Great Britain Application No. 1111030.1, filed Jun. 29, 2011, the contents of both of which are hereby incorporated by reference in their entirety.

BACKGROUND

1. Related Field

The present invention relates to an optical fibre interrogation system and in particular an optical fibre interrogation system for condition monitoring.

2. Description of Related Art

Interrogation schemes for the most common type of optical fibre transducers, fibre Bragg gratings (FBGs), require precise detection and location of the FBG centre wavelength. This can be realised using a number of methods, but the most common uses a combination of a broadband light source, tunable filter and photodetector, so that wavelength division multiplexing of serially arranged gratings can be achieved, see A. D. Kersey, T. A. Berkoff, and W. W. Morey, "Multiplexed fiber Bragg grating strain-sensor system with a fiber Fabry-Perot wavelength filter," Opt. Lett. 18, 1370-1372 (1993). Alternatively, a scanning laser can be employed instead of the broadband source and tunable filter to provide identical functionality. These schemes require precise control of the tunable spectral components to achieve satisfactory peak detection resolution and accuracy. However, high levels of performance are difficult to achieve in practical systems due to inherent nonlinearities, drifts, and electronic noise. These effects are particularly difficult to control at higher scanning frequencies. Therefore, conventional interrogation systems possess a trade-off between their extensibility (number of sensors the scheme can interrogate) and the quality of the measurement (accuracy, resolution, and rate of measurement).

An alternative, highly precise peak detection technique employing interferometry can be used, as described by A. D. Kersey, T. A. Berkoff, and W. W. Morey, in "High-resolution fibre-grating based strain sensor with interferometric wavelength-shift detection," Elec. Lett. 28 (3), 236-238 (1992). However, this technique is difficult to combine with existing multiplexing methods. One example of such a combined system is reported by Todd et al in "A novel Bragg grating sensor interrogation system utilizing a scanning filter, a Mach-Zehnder interferometer and a 3×3 coupler," Meas. Sci. Technol. 12, 771-777 (2001). However, this has a limitation of the interrogation speed due to the use of a tunable filter. Additionally, the high cost of tunable filters prevents this technology from being widely adopted.

U.S. Pat. No. 5,680,489 describes an optical interrogation system that uses fibre Bragg gratings, at least one interferometer and optical multiplexing techniques, such as differentiate-cross-multiplying and time-division multiplexing. The system uses a conventional interferometer to interrogate each sensor in parallel. Signal processing and control systems are used to modulate one arm of the interferometer to apply a periodic phase signal at the output. A problem with the system of U.S. Pat. No. 5,680,489 is that the speed of multiplexing and the measurement bandwidth are limited by the requirement for active interferometer path modulation.

US 2002/0041722 describes an optical sensing device containing fiber Bragg gratings, a scanning Fabry-Perot bandpass filter, an interferometer and multiple photodetectors. The scanning Fabry-Perot (SFP) bandpass filter is used to wavelength-multiplex multiple gratings in a single fiber, and an unbalanced Mach-Zehnder fibre interferometer made with a 3×3 coupler is used to detect strain-induced wavelength shifts. The use of a tunable filter limits the achievable interrogation rate and wastes valuable time during the scanning operation.

BRIEF SUMMARY

The present invention relates to a multiplexing optical sensor interrogation system that allows for very high resolution measurements to be achieved at high speeds and for a large number of sensors simultaneously.

According to the present invention, there is provided a monitoring system for monitoring a plurality of fibre Bragg gratings in an optical fibre, each fibre Bragg grating being sensitive to a different wavelength of light, the system comprising: a broadband source for illuminating the optical fibre; at least one optical interferometer; light feeding means for feeding to an input of the interferometer light reflected from the fibre Bragg gratings, and a processor for processing the output from the interferometer to determine the wavelength of the reflected light, wherein the light feeding means comprise a wavelength division multiplexer operable to separate light received from the optical fibre into a plurality of wavelengths, each associated with one of the fibre Bragg gratings and/or a time division mulitplexer operable to separate light received from the optical fibre into a time separated series.

A single optical interferometer may be provided and an output of the wavelength division multiplexer is connected to a switch that is operable to selectively switch light from each of the fibre Bragg gratings into the single interferometer in a time separated series.

Multiple optical interferometers may be provided, one for every fibre Bragg grating, and the wavelength division multiplexer may have multiple channels, one for every fibre Bragg grating, wherein each output of the wavelength division multiplexer is connected to a corresponding one of the interferometers.

The time division mulitplexer may comprise one or more delay lines located between each fibre Bragg grating or between groups of fibre Bragg gratings.

The optical interferometer may have two arms; and a three-by-three coupler forming the point of interference, replicating the interference pattern on all three outputs with a mutual phase difference. The optical interferometer may be an unbalanced Mach-Zehnder interferometer terminating in a three by three coupler. The optical interferometer may be a Michelson interferometer terminating in a three by three coupler.

Each interferometer may be calibrated to measure the absolute wavelength of the received light.

The processor may operable to use the measured wavelengths to determine a measure of one or more of: strain, temperature, voltage, current, and electric/magnetic fields.

The invention allows a large array of sensors to be interrogated in any sequence, at high measurement rates, and with a resolution much greater than present multiplexing schemes.

According to another aspect of the invention, there is provided a method for measuring absolute wavelength in a system having at least one fibre Bragg grating in an optical fibre, each fibre Bragg grating being sensitive to a different wavelength of light, the method comprising: illuminating the optical fibre with a broadband source; inputting light reflected from the at least one fibre Bragg grating to at least one optical interferometer that has two input arms; varying the optical path difference between the interferometer arms; and determining the wavelength using any change of phase caused by the change of optical path difference.

The method may involve feeding to the input of the interferometer in a time separated series light reflected from multiple fibre Bragg gratings; varying the optical path difference between the interferometer arms for light from each fibre Bragg grating; and determining the wavelength associated with each of the fibre Bragg gratings in turn using any change of phase caused by the change of optical path difference.

The method may involve using multiple interferometers, each one associated with one of the fibre Bragg gratings; feeding to the input of each interferometer light reflected from its associated fibre Bragg grating; varying the optical path difference between the interferometer arms; and determining the wavelength associated with each of the fibre Bragg gratings using any change of phase caused by the change of optical path difference.

Varying the optical path difference may involve heating or straining at least one arm of the interferometer.

The interferometer may be a two by three unbalanced Mach-Zehnder interferometer or a two by three Michelson interferometer.

The method may involve using a stable reference wavelength to determine the change in optical path difference.

BRIEF DESCRIPTION OF THE FIGURES

Various aspects of the invention will now be described by way of example only and with reference to the accompanying drawings, of which.

DETAILED DESCRIPTION OF VARIOUS EMBODIMENTS

The condition monitoring system of the present invention is designed for interrogation of fibre Bragg grating (FBG) sensors, which operate by strongly reflecting a single optical wavelength, known as the Bragg wavelength, and allowing all other wavelengths to pass unaffected. The reflected wavelength (Bragg wavelength) can be tuned, for example by stretching or heating the fibre, allowing FBGs to operate very well as sensors. In addition to strain and heat, various transducer arrangements have been developed for sensitising Bragg gratings to many more exotic measurands such as pressure, radiation, electromagnetic fields, voltage, current, acceleration or liquid level. Interrogation of FBG sensors, therefore, relies on detecting and monitoring the shift in the reflected wavelengths from each sensor, since this provides the information on the change in the measured parameter.

Figure 1:
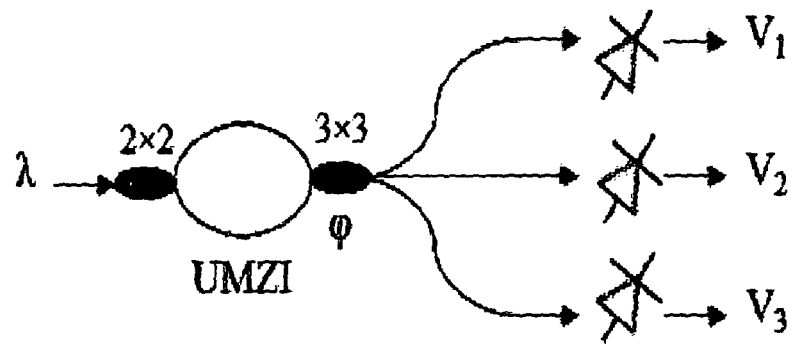
FIG. 1 is a schematic representation of a 2×3 unbalanced Mach-Zehnder interferometer (2×3 UMZI)

An accurate method for determining and tracking the change in reflected wavelength is optical interferometry. In one known technique, a two-path interferometer is used. This may be constructed in a Mach-Zehnder format between a 2×2 coupler and a 3×3 coupler realised as fused optical fibre couplers or planar waveguides. This approach is described in M. D. Todd, M. Seaver, and F. Bucholtz, "Improved, operationally-passive interferometric demodulation method using 3×3 coupler," Elec. Lett. 38 (15), 784-786 (2002), the contents of which are incorporated herein by reference. The optical arrangement is shown in FIG. 1. Light is input via a fibre optic or planar waveguide to a 2×2 coupler, where its wavelength is converted to a phase difference within the unbalanced MZI (UMZI). The outputs of the 3×3 coupler can be used to determine this phase difference by the ratio of their optical powers (voltages after photodetection), and hence track the wavelength of an optical input. The contents of this Figure are referred to hereafter as "2×3 UMZI+PDs".

In FIG. 1, the 3×3 coupler is the point of interference of the two optical paths. Due to the physical characteristics of single fusion 3×3 couplers, the optical power at the three MZI outputs represents the same interference pattern spaced by 120° from each other. After photodetection, the corresponding voltage outputs can be described most concisely as $$V_n = a_n + b_n \cos(\phi + \theta_n) \quad (1)$$

where $a_n$ and $b_n$ are the amplitudes of the dc and ac components of the interference fringes respectively, and $\theta_n$ is the initial phase (nominally 0°, 120°, −120° for n=1, 2, 3). By modulating the interferometer by at least $2\pi$ during system calibration (see later), the above values can be determined for each of the three output channels. If normalised constants are prepared ($\alpha_n = a_n/a_1$ and $\beta_n = b_n/b_1$), the phase can then be calculated using the equation $$\phi(t) = \tan^{-1}\left[\frac{(\mu_2 - \mu_3)V_1/\alpha_1 + (\mu_3 - \mu_1)V_2/\alpha_2 + (\mu_1 - \mu_2)V_3/\alpha_3}{(\gamma_2 - \gamma_3)V_1/\alpha_1 + (\gamma_3 - \gamma_1)V_2/\alpha_2 + (\gamma_1 - \gamma_2)V_3/\alpha_3}\right] \quad (2)$$

where $\gamma_n = \beta_n \sin(\theta_n/\alpha_n)$ and $\mu_n = \beta_n \cos(\theta_n/\alpha_n)$.

Using this technique, an optical wavelength guided to the input of the MZI can be determined immediately from a single sample on each $V_{1-3}$.

Figure 2:
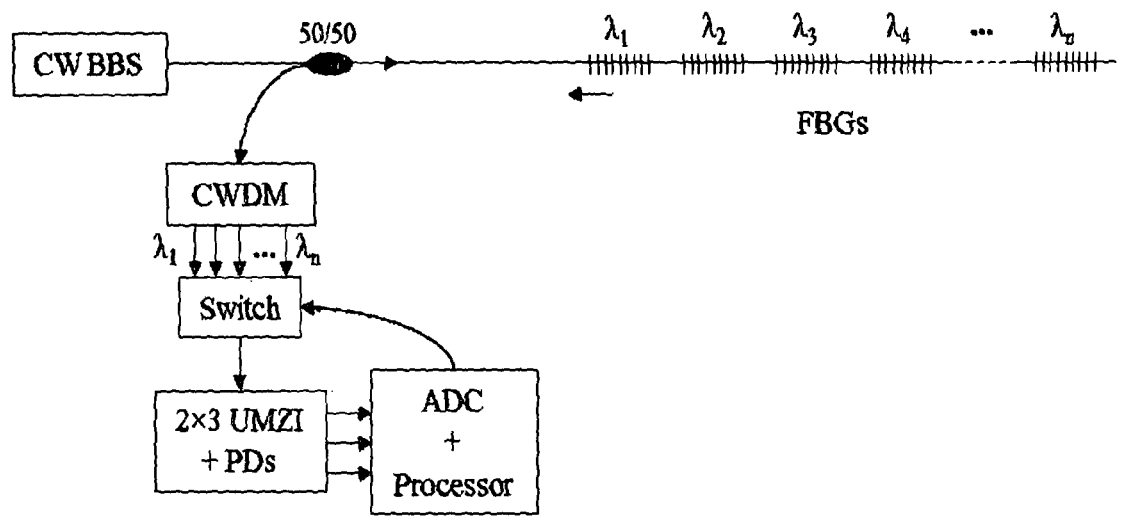
FIG. 2 is a block diagram of a first interrogation/condition monitoring system, in which in fibre Bragg gratings are being monitored.

FIG. 2 shows a sensor interrogation system for interrogating a plurality of fibre Bragg gratings (FBGs), n, each responsive to different wavelengths. The FBGs are provided on an optical fibre. At one end of the fibre a continuous wave broadband source is provided to inject an interrogation signal into the fibre. A coupler is provided to couple light from the source into the fibre, and to couple light reflected from the plurality of FBGs to a detector. The detector has a course wavelength division multiplexer (CWDM) unit connected to a fast optical path switch, which is in turn connected to the input of a demodulator of the type shown in FIG. 1.

The FBG wavelengths and CWDM channel centre wavelengths are matched, so that each channel of the CWDM is associated with a particular FBG. Therefore, every FBG wavelength must be unique and must correspond to a single CWDM channel. Light from the demodulator is input to an analogue to digital converter and processor unit, where it is analysed to determine the wavelength of the light, thereby to allow an assessment of the condition of the system being monitored. This exploits the immediacy of the phase demodulation technique by selecting, at rates limited only by switching speeds and processing capability, which sensor reflection is guided to the interferometer for detection.

In use, the continuous wave broadband source illuminates a wavelength range covering the reflection wavelengths of all sensors within the sensor array. Reflected wavelengths from all sensors return simultaneously and continuously to the CWDM unit, which separates off signals from each sensor onto independent output fibres. An optical path switch, driven by the ADC/Processor unit, is used to guide the reflected signal of each sensor in turn to the demodulation platform where the voltages $V_{1-n}$ are immediately sampled by the ADC unit and thereafter processed to determine the FBG wavelength. The wavelength switch can select between sensor signals in any order. In addition, the ADC sampling rate may be set to any integer multiple of the switching rate to enable oversampling for the purposes of electronic noise filtering and hence further improved measurement resolution.

Figure 3:
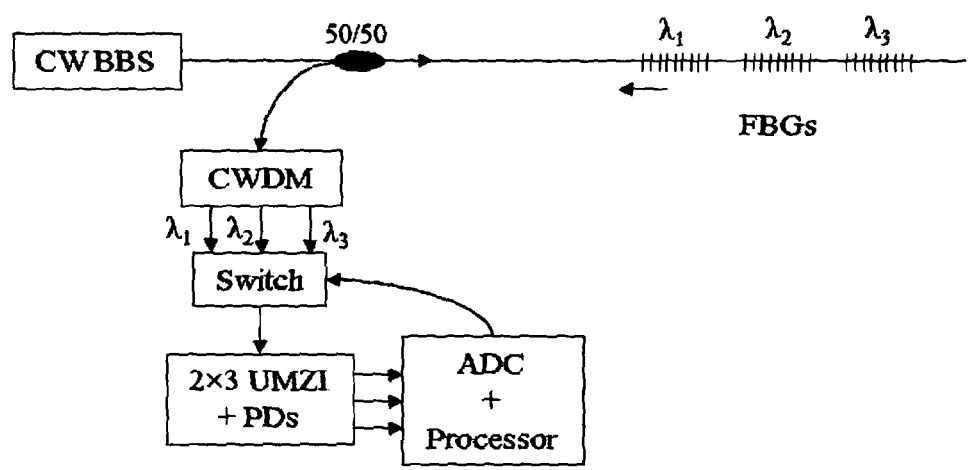
FIG. 3 is a block diagram similar to that of FIG. 2, in which three fibre Bragg gratings are monitored.

The system of FIG. 2 has been tested using three sensors, as shown in FIG. 3. The three CWDM and FBG centre wavelengths were matched (1535 nm, 1545 nm, 1555 nm). Each FBG was bonded to a piezoelectric stack to allow straining of the FBGs by application of voltages. This allows the simulation of straining caused by changes in environmental conditions, which would be experienced in a real monitoring situation. A three-phase voltage transformer was then used to drive all sensors simultaneously. The ADC/Processor unit was configured for 3 kHz switching/sampling rate, allowing for 1 kHz acquisition rate per sensor. The results of various tests are shown in FIGS. 4 to 6.

Figure 4:
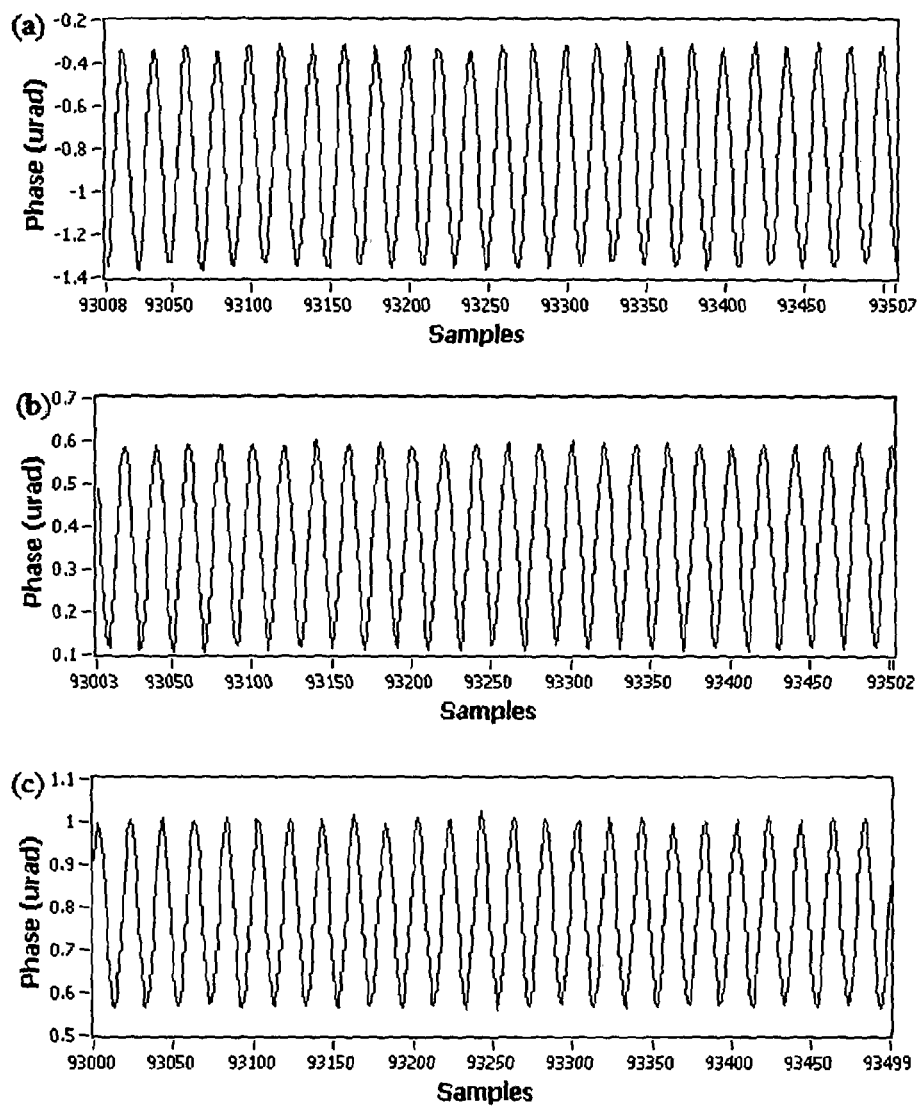
FIG. 4 shows the results of simultaneous interrogation of three FBG sensors ((a) 1535 nm, (b) 1545 nm, (c) 1555 nm) indirectly measuring 3-phase ac 50 Hz voltage using the system of FIG. 3.

FIGS. 4 (a)-(c) show the signals of each sensor ((a) 1535 nm, (b) 1545 nm, (c) 1555 nm) during 50 Hz ac voltage application. The 120° shift between voltage phasors can be clearly seen. The difference in signal amplitudes is due to difference in piezoelectric stack characteristics. FIGS. 5 (a)-(c) show the frequency domain transform of the signals after phase to strain conversion. This illustrates the excellent signal-to-noise ratio achievable even without anti-alias filtering or sample averaging. FIGS. 6 (a)-(c) were recorded during application of a single voltage signal at one sensor (FIG. 6(a)). This illustrates the independence of measurements and lack of cross-talk while using this scheme. It can be clearly seen that there is no trace of cross-talk between sensors on the spectra of either other sensor (FIGS. 6 (b) and (c)).

Figure 5:
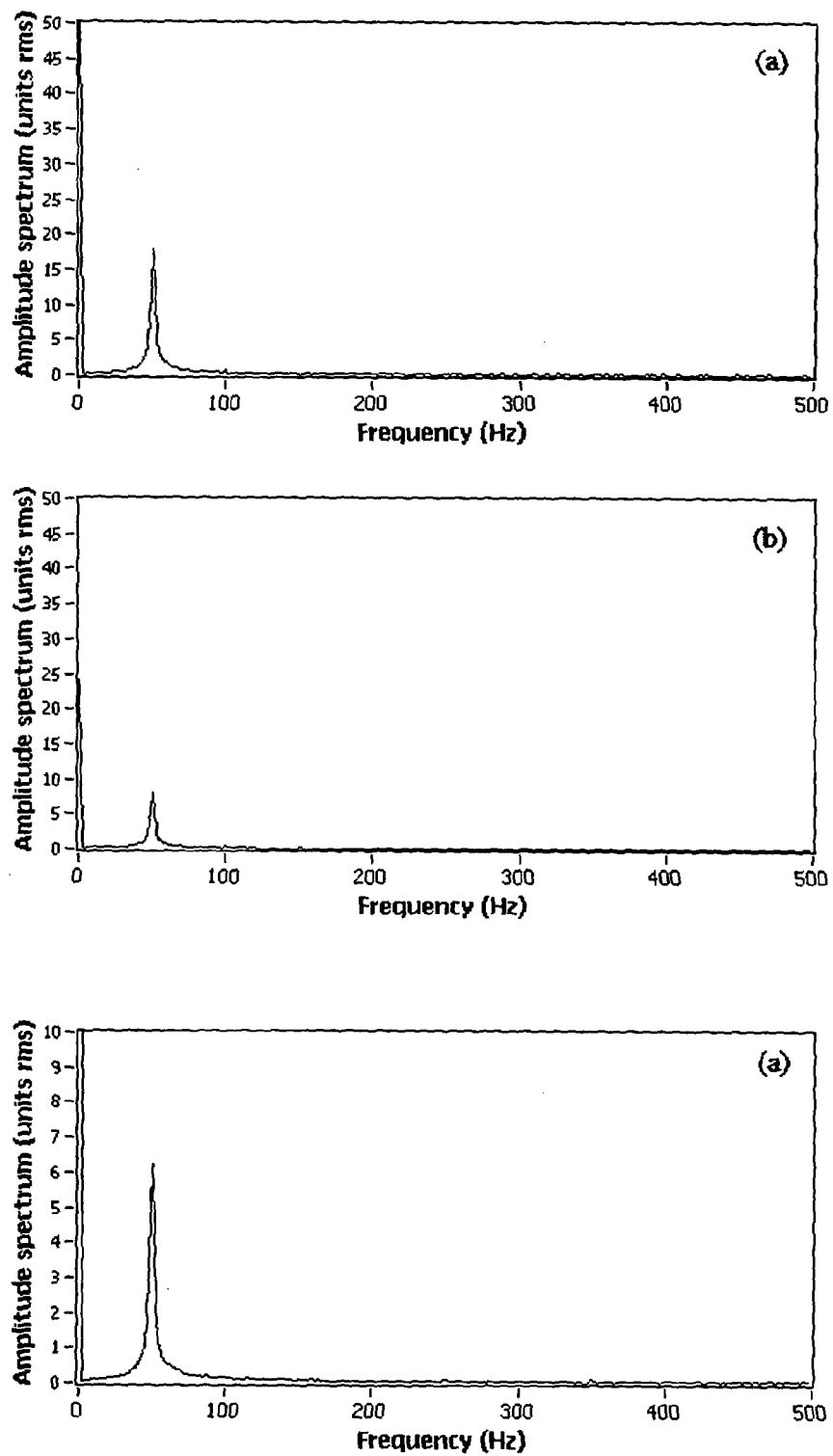
FIGS. 5 (a)-(c) show the frequency domain transform of the signals of FIG. 4 after phase to strain conversion.
Figure 6:
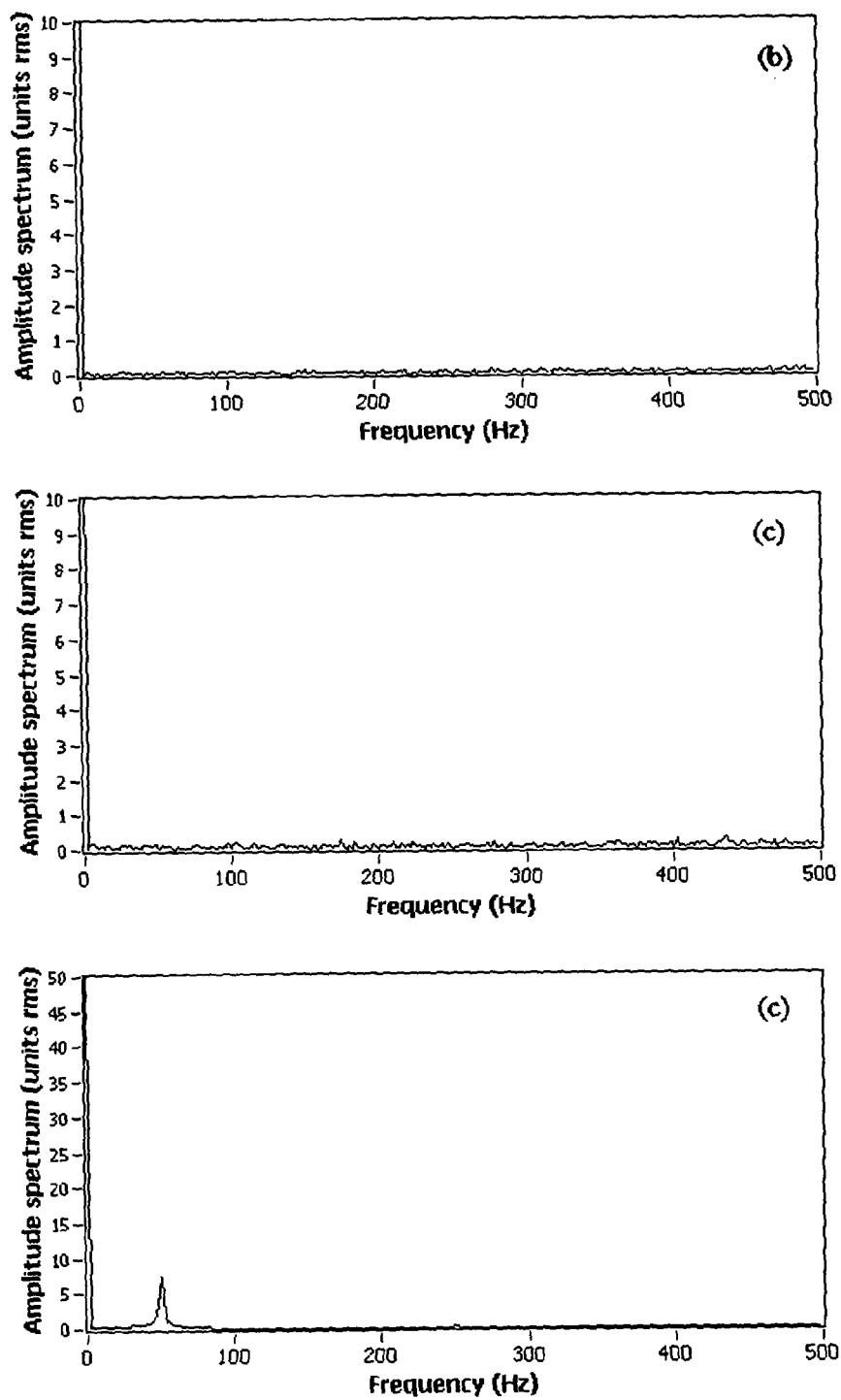
FIGS. 6 (a)-(c) demonstrate the lack of cross-sensitivity when a signal is applied only to one of the three FBG sensors of FIG. 4.

From FIGS. 5 and 6 the resolution of the interferometric technique is demonstrated to be approximately 10 nanostrains rms before filtering or sample averaging. This contrasts with a 1 microstrain resolution of higher end commercially available interrogation systems, demonstrating a two orders of magnitude improvement. With sample averaging or filtering, this result can be improved by a further order of magnitude.

Figure 7:
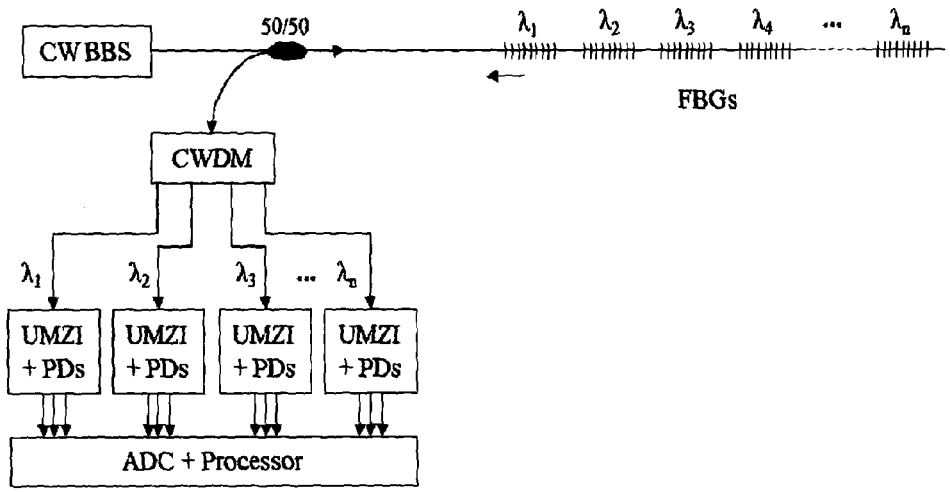
FIG. 7 is a block diagram of a second interrogation/condition monitoring system.

FIG. 7 shows another sensor interrogation system. This is related to the system of FIG. 2, in that a CWDM module is used to separate reflected signals from each sensor. However, instead of using a single demodulator, multiple demodulators are provided one for each FBG, so that multiple signals from the CWDM can be simultaneously passed to the demodulators. Hence, instead of selecting and guiding to the demodulation platform each sensor reflection in turn, in FIG. 7 all sensor reflections are demodulated and processed in parallel by the ADC/Processor unit. In this case, the measurement rate is limited only by the capability of the ADC/Processor stage.

Figure 8:
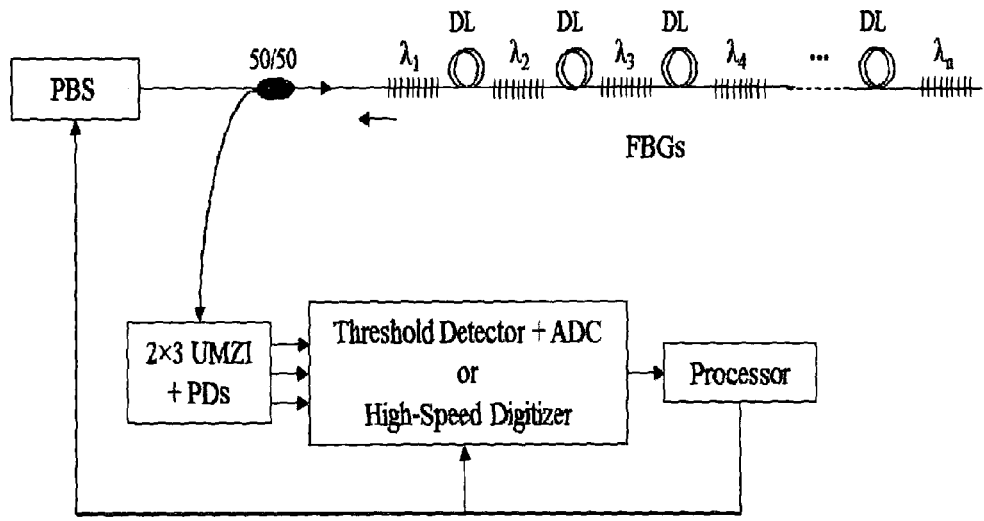
FIG. 8 is a block diagram of a third interrogation/condition monitoring system.

FIG. 8 shows another interrogation system. This is based on a time division multiplexing scheme that is similar to FIG. 2, in that one sensor reflection is guided at a time to the demodulation platform. This system has a pulsed broadband source (PBS) and a plurality of FBGs. Between each FBG is a delay line. The delay lines ensure that after pulsing the source the sensor reflections return in temporal series to the demodulation platform in the order that they are illuminated. A coupler is provided to couple light from the source into the fibre, and to couple light reflected from the plurality of FBGs to a detector. The detector has a demodulator of the type shown in FIG. 1 and a threshold detector and ADC, which is connected at its output to a processor. The processor is connected to the pulsed broadband source and the threshold detector and ADC and each of these can be controlled by processing.

In use, the processor sends a signal to the source to cause pulses to be emitted. The pulses travel out towards the FBG sensors, so that each is illuminated and in turn produces a sensor reflection. The delay lines ensure that the time difference between the arrivals of consecutive sensor signals at the demodulation platform is sufficient for one to be recorded and processed before the next arrives. In order to capture the voltage levels $V_{1-n}$ as they briefly arrive, the ADC unit and threshold detector are used. Depending on the sampling speed of the ADC unit, several samples can be acquired per single pulse to enable signal averaging for noise reduction.

For the time division multiplexing system of FIG. 8, the Bragg wavelengths of each sensor are not required to be unique or specified accurately since the system is not multiplexing by way of wavelength division. This allows greater freedom during system design. This is because the sensors can be fabricated to be absolutely identical, simplifying manufacturing, replacements, and the modular nature of installations. Also, the number of sensors can be very large (100s), owing to the TDM nature of the system. This is, in contrast, to the systems of FIGS. 2 and 7, where WDM limits sensors to the number that can fit within the bandwidth of the source.

Figure 9:
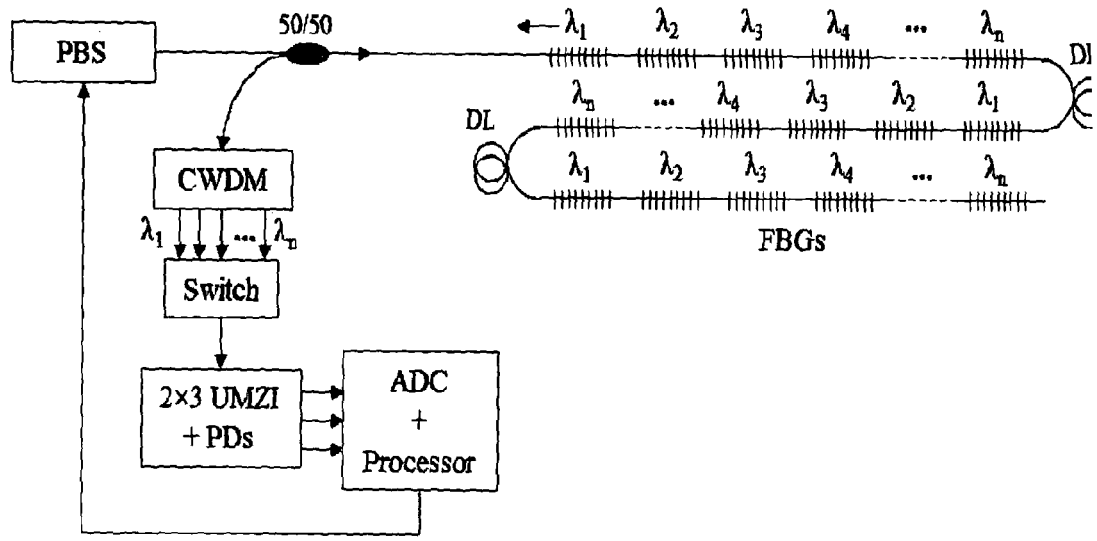
FIG. 9 is a block diagram of a fourth interrogation/condition monitoring system.

FIG. 9 shows yet another interrogation system. This uses some of the features of the systems of FIGS. 2 and 8 by combining TDM and WDM elements to produce a system that is capable of interrogating multiple sensor arrays. Here, a pulsed broadband source (PBS) is used. At the sensors, arrays of FBGs are separated by delay lines such that a set of reflections from arrays return simultaneously, with a time difference between the arrivals of array reflections. Upon arrival of the sensor array reflections, a WDM module is used to split sensor wavelengths $\lambda_1$-$\lambda_n$ onto individual output fibres for selection by the optical path switch, as done in FIG. 2. The delay between the arrivals of sensor array reflections should be long enough to allow interrogation of all sensors within the array using the switching technique of FIG. 2 before the arrival of reflections from the next array. In order to synchronize switching WDM with the arrival of TDM reflections, the processor may wait for illumination at $\lambda_1$ before proceeding to interrogate other wavelengths.

With this technique, there is a merging of the benefits of both the TDM and WDM techniques. The fast WDM switching interrogation technique may be implemented over not only one but multiple identical sensor arrays, each of which are illuminated in turn by the travelling broadband pulse. In this way, a very large number of sensors may be interrogated. Additionally, each array of wavelength multiplexed sensors, $\lambda_1$-$\lambda_n$ may be used for monitoring of smaller components of a larger system or plant where the mounting of additional delay lines between individual sensors may be restrictive but placing delay lines between the arrays that are spaced farther apart may not pose the same restriction.

Figure 10:
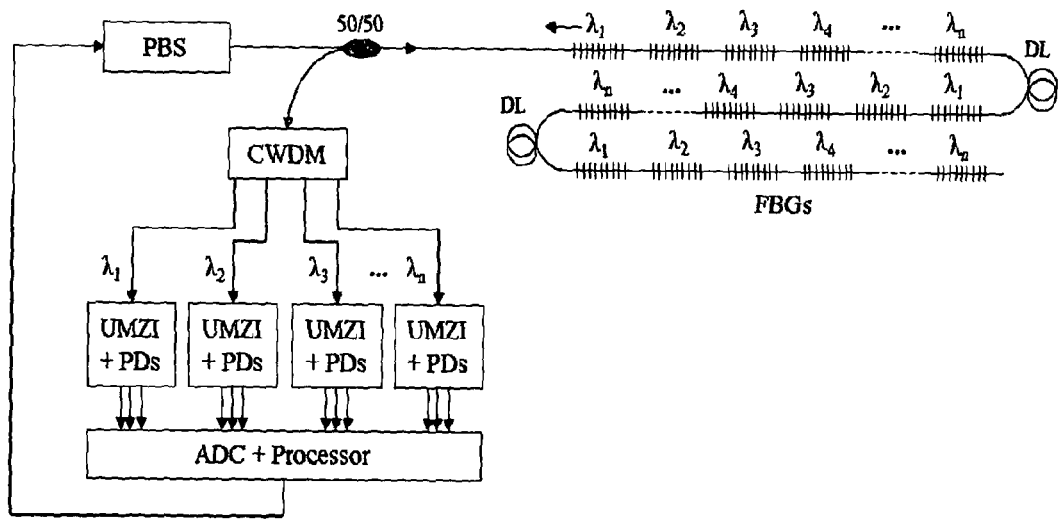
FIG. 10 is a block diagram of a fifth interrogation/condition monitoring system.

FIG. 10 shows a system that is similar to that of FIG. 9, but in which the switch is removed and demodulator is provided for every sensor in order to process all sensor array reflections in parallel. As sensor array reflections return during illumination from the pulsed source, the WDM unit separates the reflections of individual sensors within the array onto separate output fibres. Then, before the reflection from the next sensor array arrives, the processor must interrogate all sensors $\lambda_1$-$\lambda_n$.

Figure 11:
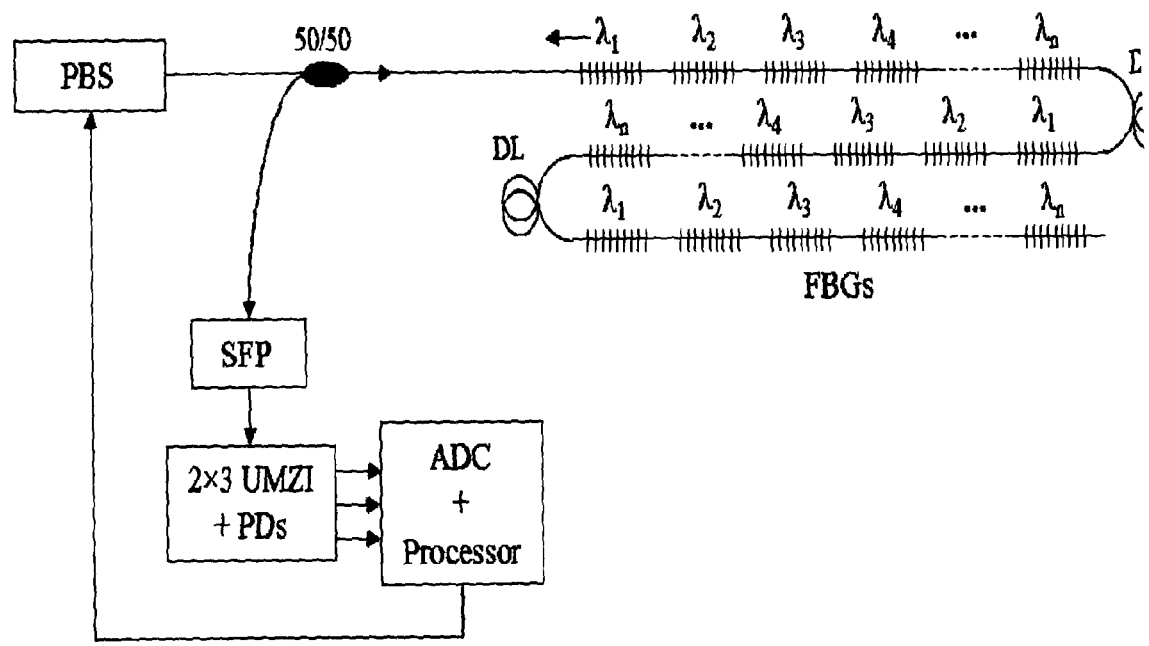
FIG. 11 is a block diagram of a sixth interrogation/condition monitoring system.

FIG. 11 shows a system similar to that of FIG. 8, except that the wavelength switch (comprised of the combination of WDM module and optical path switch) is replaced by a tunable optical filter (commonly a scanning Fabry-Perót filter (SFP)) that is switched or stepped between different wavelengths, the switched/stepped filter wavelengths corresponding to the wavelengths of the Bragg gratings. Such wavelength filters can be tuned, for example by application of a driving voltage, allowing the filter to replace the wavelength switch of FIG. 2. A step change in the filter centre wavelength may be produced by a stepping, calibrated control voltage signal. In this case, the tunable filter may move swiftly to centre wavelengths $\lambda_1$-$\lambda_n$. The filter is a broadband filter and is tuned using discrete voltage steps. The stability of its centre wavelength can be relaxed compared to conventional narrowband filters used for reconstruction of detailed FBG reflection spectra. Thus, the same functionality as the CWDM/Switch combination (selection of sensor reflection for guidance to the demodulation platform) may be achieved by a calibrated SFP module.

The transfer function, i.e. wavelength to phase conversion, of the unbalanced Mach-Zehnder interferometer of FIG. 1 drifts slowly over time with changes in the environmental temperature. Such drift alters the sensitivity of the sensors to changes in measurands. In addition, the device picks up unwanted acoustic noise and vibrations which contribute to the noise level of all sensor signals. In practice, therefore, the interferometer module must be made robust to the external influence of both temperature and vibration. This can be most easily achieved by miniaturisation of the interferometer, for example by fabrication of the device in a compact, monolithic, planar form rather than using fibre couplers. Fabrication of the device in planar form would allow it to be easily potted in vibration-dampening gel, and mounted on a thermoelectrically cooled platform, thus ensuring the robustness of the device to both forms of interference.

After fabrication of the interferometer (either in fibre or planar form) the device must be calibrated to determine the constants required for deployment of Equation (2). To do so, the phase difference $\phi$ must be modulated by at least $2\pi$ radians, thus driving the interference patterns on all three outputs through at least one maximum and minimum. Then using a straightforward procedure for determining the optical power splitting ratio and the phase angles between 3×3 outputs, such as that described by Schleip et al, see "Phase sensitive investigations of 3×3 single mode fibre directional couplers", Elec. Lett. 29, 68-70 (1993), the required parameters $a_n$, $b_n$, and $\theta_n$ as discussed above may be recorded.

The $2\pi$ phase modulation required for this calibration procedure can be achieved either by stretching one or both arms of the interferometer, which is feasible for both fibre and planar embodiments of the interferometer. In the fibre embodiment, a piezoelectric stretcher can be employed to stretch the interferometer arms; in the planar construction, a suitable modulation technique can be used, e.g., utilising electro- or thermo-optic effects or MEMS (micro-electromechanical systems) actuation. Planar MZI modulators are commercially available, e.g., from JDSU, and similar techniques could potentially be adopted in this application. Alternatively, calibration can be achieved through the modulation of the input wavelength. Input wavelength modulation does not require manipulation of the interferometer itself in any way. There are a number of ways by which this may be achieved, the simplest of which may be to guide a strain-modulated FBG reflection through the interferometer temporarily. In general, system calibration would be required infrequently, and could be automated to perform during system 'start up' or when demanded by the user.

To improve stability, a temperature-controlled athermal FBG can be used as a stable wavelength reference (connected in series or in parallel with the sensor gratings) that can be checked periodically to ensure long-term accuracy of the measurements. Adjustment for changes in sensor signal offsets over long periods of time as determined by these periodic checks can easily be automated and would form a component of the processor platform.

In many measurement applications, it is desirable not only to know the change in a measurand but also to know its absolute value at some point in time. The scheme described above enables fast, accurate measurement of changes in sensor responses, including both dynamic and quasi-static responses. However, measurements are referenced to the initial state acquired at the 'switch on' time of the system, and are taken relative to this point in time.

To enable absolute measurements, a procedure may be implemented during the 'switch on' initialisation phase which calculates the absolute reflected wavelengths of each sensor, and stores these starting values for use as references during normal operation. In this way, after initialisation, changes in the sensor responses can be tracked continually to enable measurement of absolute wavelength in all sensors with speed and accuracy.

The wavelength-to-phase relationship in the unbalanced Mach-Zehnder interferometer illustrated in FIG. 1 may be described by $$\phi = \frac{2\pi n d}{\lambda_B} \qquad (3)$$

where $\phi$ is the phase difference at the point of interference, $\lambda_B$ is the sensor reflected wavelength, and nd is the optical path difference (OPD) between interferometer arms.

As exploited for measurement of the change in sensor response, the phase and wavelength are related by the value of OPD. This invites a reciprocal use of the relationship during initialisation where, instead of a changing sensor wavelength, the OPD may be changed in order to determine the wavelength in absolute terms from the induced change in phase. During the OPD change, phase changes may be acquired from all sensors simultaneously using the multiplexing techniques described previously. Using the recorded phase changes, the absolute value of each individual sensor wavelength may then be found from the formula:

$$\lambda_B = 2\pi \frac{\delta OPD}{\delta \phi} \qquad (4)$$

The required sweeping or stepping of the interferometer OPD during initialisation can be achieved by a variety of mechanisms. Fundamentally, the OPD is a function of both the fibre refractive index and the physical path difference between arms. Heating or stretching of one or both arms may therefore be used to tune the OPD. This is commonly achieved using piezoelectric elements to apply strain to one of the fibre arms, or by active temperature control of the MZI unit. However, it will be understood by one versed in the field that a variety of alternative techniques exist to provide this functionality.

As an alternative to continuous scanning of the OPD between two values, it may be preferable to instantaneously step or switch the OPD in order to detect the corresponding step in sensor phases. This could be implemented in a number of ways, including switching the optical path between two MZIs with differing OPDs, or by applying a stepping voltage to a piezoelectric actuator on one MZI arm. After calculating the relationship between OPD step and phase step, Equation (4) may be used to determine input wavelength as previously described.

Where accurate knowledge of the change in OPD during the initialization sweep is not known through calibration or other means, a stable reference wavelength may be used to determine, from the change in phase, the magnitude of the OPD sweep. This value of OPD change may then be used in Equation (4) to calculate initially unknown sensor wavelengths as described. Thus, accurate control of the OPD scan rate or magnitude is not a requirement of this procedure.

The present invention can be used in many different sensing and condition monitoring applications. For example, wind farms require large-scale health monitoring of the mechanical structures and performance monitoring of the associated plant. The present invention could be used for simultaneous measurement of strain, temperature, voltage, current, electric/magnetic fields, and numerous other effects that have to be monitored in wind farms. Also, the invention could be used for protection and security of transmission systems for electrical power delivery, as it is electrically-isolated and can provide immediate knowledge of voltage and current at a number of distributed points along a power line. Furthermore, within the oil and gas sector there is a need to measure pressure at a very high resolution and accuracy. The present invention could be used for all of these applications.

A skilled person will appreciate that variations of the disclosed arrangements are possible without departing from the invention. For example, although the various embodiments of the invention are described as including a 2×3 unbalanced Mach-Zehnder, as shown in FIG. 1, other interferometer arrangements could be used to provide the same function, i.e. to convert an input optical wavelength into an optical phase difference and subsequently into three optical intensities. The ratio of these intensities (which may be expressed as the ratio of three voltages after the light is photodetected) may be related back to the phase difference, and finally back to the input optical wavelength. The requirements for this stage are a two-path interferometer that converts the optical wavelength into a phase difference, and a 3×3 coupler that acts as the point of interference and produces the critical mutual phase difference between the three output fibres. Thus, a 3×3 coupler must form the point of interference, and it must be two paths experiencing the same input optical wavelength that are brought to interference.

Figure 12B:
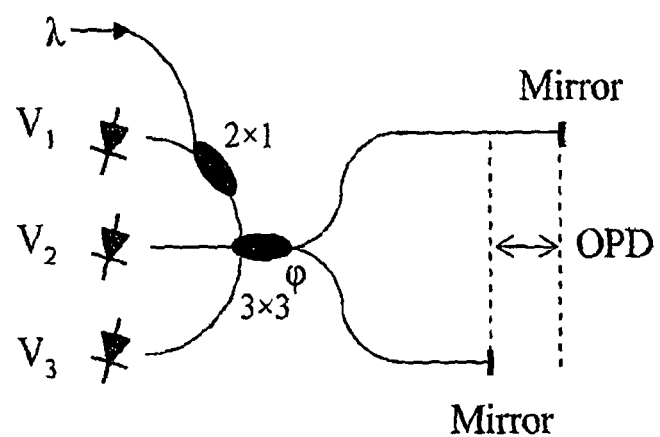
FIG. 12(b) shows a schematic representation of another unbalanced Michelson interferometer that can be used in place of the interferometer of FIG. 1
Figure 12A:
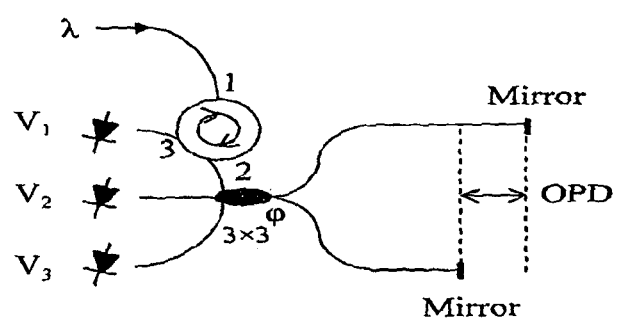
FIG. 12(a) shows a schematic representation of an unbalanced Michelson interferometer that can be used in place of the interferometer of FIG. 1.

Although a Mach-Zehnder architecture may be the simplest implementation, the function of this stage could be achieved by other architectures. As an example, FIG. 12(a) shows an optical fibre based Michelson interferometer implementation of the same functionality. This has two mirrors separated by a known optical path difference. Light reflected from each mirror is directed into one of two optical fibres and guided to a 3×3 coupler, where it interferes and is split into three different phase components. At the output of the 3×3 coupler are three optical fibres that are coupled to one or three detectors. Each phase component is converted to a voltage at one of the detectors. This phase/voltage measurement is used as before to determine the wavelength of the light. In the arrangement of FIG. 12(a) light is input via a light circulator that is coupled with one of the output fibres from the 3×3 coupler. FIG. 12(b) shows another Michelson interferometer, in which the circulator is replaced by a second coupler, in this case a 2×1 coupler. Accordingly the above description of the specific embodiment is made by way of example only and not for the purposes of limitation. It will be clear to the skilled person that minor modifications may be made without significant changes to the operation described.

The invention claimed is:

1. A monitoring system for monitoring a plurality of fibre Bragg gratings in an optical fibre, each fibre Bragg grating being sensitive to a different wavelength of light, the system comprising:
    a broadband source for illuminating the optical fibre;
    a single optical interferometer;
    light feeding means for feeding to an input of the interferometer light reflected from the fibre Bragg gratings, and
    a processor for processing the output from the interferometer to determine the wavelength of the reflected light, wherein:
        the light feeding means comprise a wavelength division multiplexer operable to separate light received from the optical fibre into a plurality of wavelengths, each associated with one of the plurality of fibre Bragg gratings, the wavelength division multiplexer having multiple channels, one for each of the plurality of fibre Bragg gratings; and
        an optical switch is operable to selectively switch light from each of the plurality of fibre Bragg gratings into the single optical interferometer in a time separated series.

2. A monitoring system as claimed in claim 1, wherein the optical interferometer has a two channel input; and a coupler for allowing interference of light from the two channel inputs and for separating the interfering light into three different phase components.

3. A monitoring system as claimed in claim 2, wherein the optical interferometer is a two by three unbalanced Mach-Zehnder interferometer.

4. A monitoring system as claimed in claim 2, wherein the optical interferometer is a two by three Michelson interferometer.

5. A monitoring system as claimed in claim 1, wherein the interferometer is calibrated to measure the absolute wavelength of the received light.

6. A monitoring system as claimed in claim 1, wherein the processor is operable to use the measured wavelengths to determine a measure of one or more of: strain, temperature, voltage, current, and electric/magnetic fields.

7. A method for measuring an absolute wavelength in a system having at least one fibre Bragg grating in an optical fibre, each fibre Bragg grating being sensitive to a different wavelength of light, the method comprising:
  during an initializing stage of said system:
    illuminating the optical fibre with a broadband source;
    inputting light reflected from the at least one fibre Bragg grating to a single optical interferometer that has two input arms;
    varying the optical path difference between the interferometer arms; and
    determining the absolute wavelength using any change of phase caused by the change of optical path difference; and
    storing the absolute wavelength as a function of change in phase; and
  during use of said system, using the stored absolute wavelength reference value and a measure of change of phase to determine absolute wavelength of light reflected from the at least one fibre Bragg grating.

8. A method as claimed in claim 7 comprising feeding to the input of the interferometer in a time separated series light reflected from multiple fibre Bragg gratings; varying the optical path difference between the interferometer arms for light from each fibre Bragg grating; and determining the wavelength associated with each of the fibre Bragg gratings in turn using any change of phase caused by the change of optical path difference.

9. A method as claimed in claim 7 comprising using multiple interferometers, each one associated with one of the fibre Bragg gratings; feeding to the input of each interferometer light reflected from its associated fibre Bragg grating; varying the optical path difference between the interferometer arms; and determining the wavelength associated with each of the fibre Bragg gratings using any change of phase caused by the change of optical path difference.

10. A method as claimed in claim 7, wherein varying the optical path differences involves heating or straining at least one arm of the interferometer.

11. A method as claimed in claim 7, wherein the interferometer is a two by three unbalanced Mach-Zehnder interferometer or a two by three Michelson interferometer.

12. A method as claimed in claim 7, wherein a stable reference wavelength is used to determine the change in optical path difference.

* * * * *

UNITED STATES PATENT AND TRADEMARK OFFICE
CERTIFICATE OF CORRECTION

PATENT NO. : 9,310,273 B2
APPLICATION NO. : 14/128621
DATED : April 12, 2016
INVENTOR(S) : Niewczas et al.

Page 1 of 1

It is certified that error appears in the above-identified patent and that said Letters Patent is hereby corrected as shown below:

Title Page

Item "(73) Assignee: University of Strathelyde" should read

--(73) Assignee: University of Strathclyde--

Signed and Sealed this
Fifth Day of July, 2016

Michelle K. Lee
*Director of the United States Patent and Trademark Office*